(No Model.)  3 Sheets—Sheet 1.
S. R. SMITH & E. MYERS.
SAW MILL HEAD BLOCK.
No. 409,517. Patented Aug. 20, 1889.
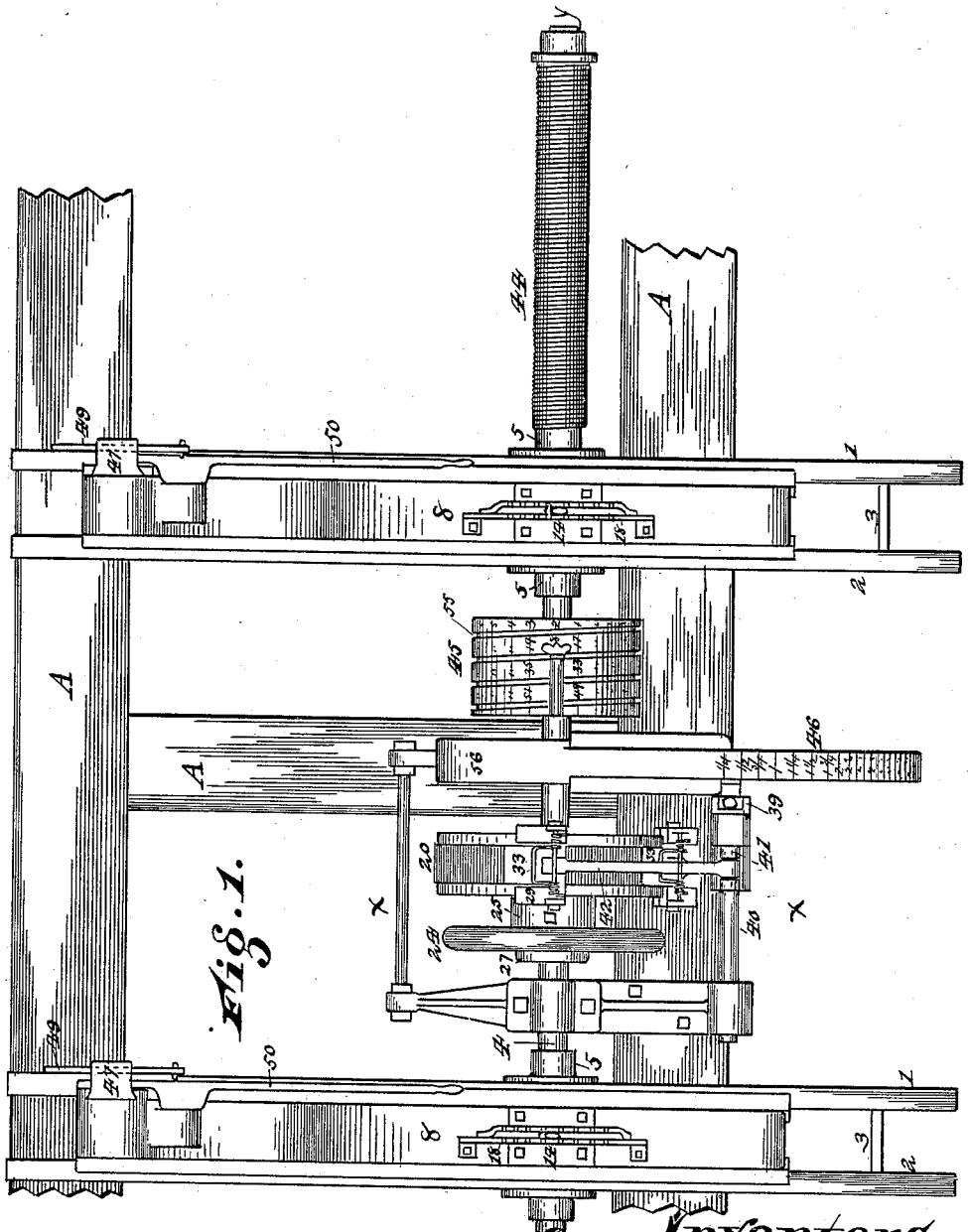

(No Model.) 3 Sheets—Sheet 2.
S. R. SMITH & E. MYERS.
SAW MILL HEAD BLOCK.
No. 409,517. Patented Aug. 20, 1889.
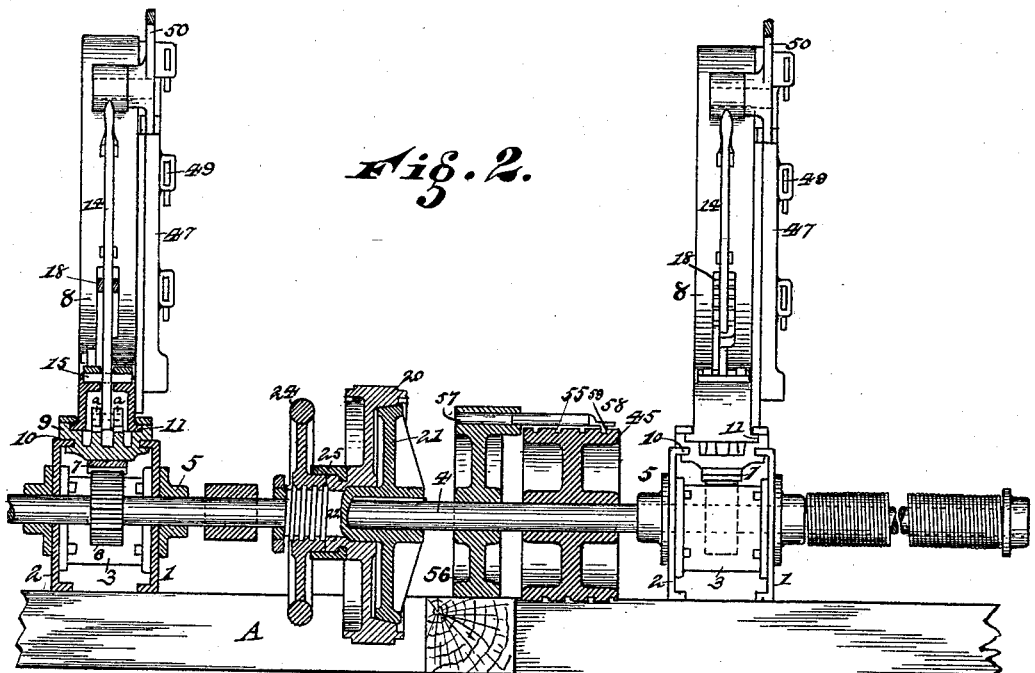
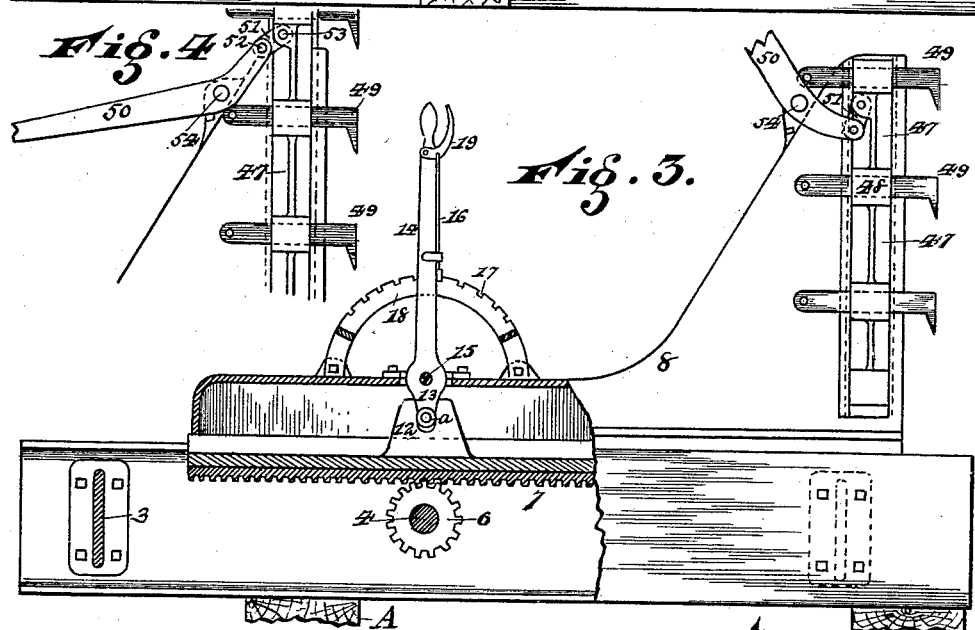

(No Model.) 3 Sheets—Sheet 3.
S. R. SMITH & E. MYERS.
SAW MILL HEAD BLOCK.
No. 409,517. Patented Aug. 20, 1889.
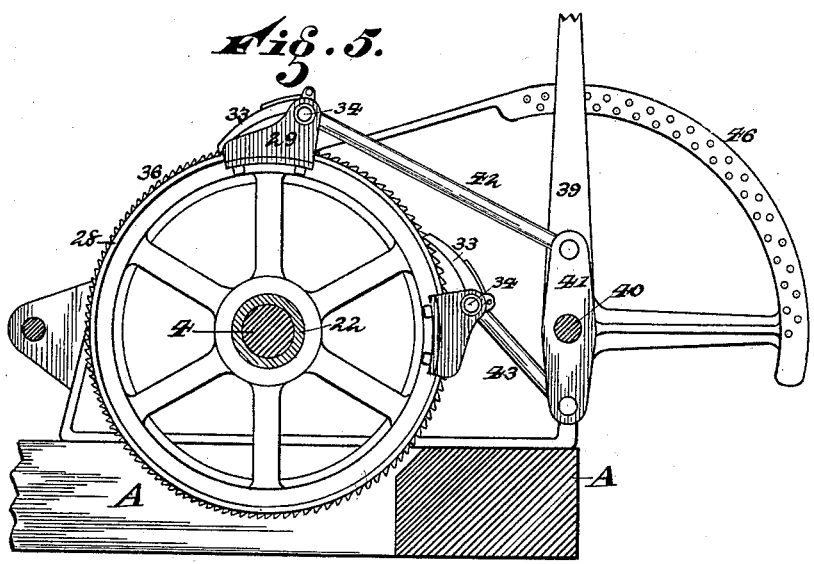
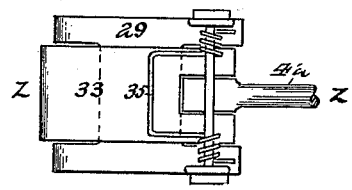
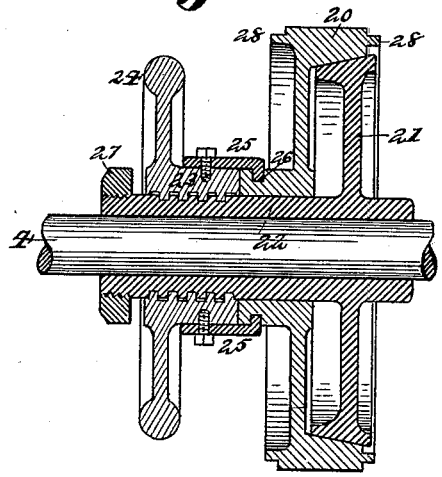
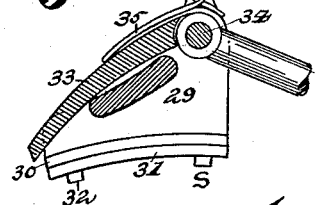
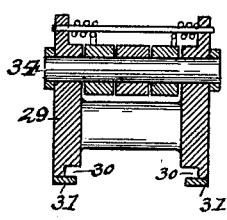
Attest
J. Watson Sims
T. Simmons
Inventors
Samuel R Smith
Edward Myers
by Wood & Boyd
their Attorneys
N. PETERS, Photo-Lithographer, Washington, D. C.

UNITED STATES PATENT OFFICE.

SAMUEL R. SMITH AND EDWARD MYERS, OF CINCINNATI, OHIO, ASSIGNORS TO SMITH, MYERS & SCHNIER, OF SAME PLACE.

SAW-MILL HEAD-BLOCK.

SPECIFICATION forming part of Letters Patent No. 409,517, dated August 20, 1889.

Application filed March 13, 1888. Renewed February 5, 1889. Serial No. 298,771. (No model.)

*To all whom it may concern:*

Be it known that we, SAMUEL R. SMITH and EDWARD MYERS, of Cincinnati, in the county of Hamilton and State of Ohio, have invented certain new and useful Improvements in Saw-Mill Head-Blocks, of which the following is a specification.

This invention relates to saw-mill carriages for saw-mills, and has for its objects to provide novel means for operating the knees of the head-blocks and to indicate the extent of their adjustment. These objects we accomplish by the combination of devices hereinafter described and claimed, reference being made to the accompanying drawings, in which—

Figure 1 is a top plan view of a portion of a saw-mill carriage embodying our invention. Fig. 2 is a central vertical section on line $y\,y$, Fig. 1. Fig. 3 is a central vertical section of one of the head-blocks, shown partly in side elevation. Fig. 4 is a similar elevation of a dogging device, showing the lever locked. Fig. 5 is a section on line $x\,x$, Fig. 1. Fig. 6 is an enlarged central vertical section of the ratchet-wheel and clutch mechanism. Fig. 7 is a top plan view of the pawl. Fig. 8 is a section on line $z\,z$, Fig. 7. Fig. 9 is a section on line $s\,s$, Fig. 8.

1 and 2 represent the frames of the head-blocks. These are preferably made of channel-irons connected together by suitable T-shaped brackets or connecting-pieces 3. These frame-pieces are suitably mounted on supporting-timbers A, connected together in any desired manner so as to be substantial.

4 represents the setting-shaft, which is made continuous and journaled in bearings 5 in the frame of the head-blocks, as shown in Fig. 2.

6 represents pinions keyed to said shaft within the hollow frame of the head-block.

7 represents a rack-bar provided with teeth, each meshing, respectively, with its pinion 6.

8 represents the knee of the head-block, which is connected to the frame-piece by means of a grooved sill 9, the form of which in cross-section is shown in Fig. 2. It is provided with gains, into which the flanges 10 of the channel-irons of the frame-pieces engage. It is also provided with gains which form ways to receive said flanges 11 of the knee 8, so as to allow said knee to move longitudinally in said gains. In order to lock the knee to said sill 9, to cause it to be moved by the revolution of the pinion, we have provided the following device:

12 represents a projection rising from the sill 9 and slotted to receive the end 13 of the setting-lever 14. Said lever is pivoted to the base of the knee by the center 15. Said lever is provided with a locking-rod 16, which engages with the notches 17 on the segment 18.

*a* represents friction-rollers journaled at the end of lever 14, which move against the sides of the slots in said projection 12, so as to prevent friction and allow of an easy movement of the parts.

19 represents a releasing-lever of the usual form of construction. Each of the knees has its appropriate lever 14, and when it is desired to move one of the knees without the other its lever is operated individually, as follows: The lock 16 is released and the lever 14 moved on its fulcrum until the base of the knee 8 has been carried through the appropriate distance in either direction, as shown by the dotted lines in Fig. 3. Then the lever 14 is locked in the proper notch of the segment 18. The knees are operated in unison by the following instrumentality: Each knee 8 is provided with a rack-bar 7, meshing with its pinion 6, and they are driven by shaft 4, to which they are keyed.

20 represents a ratchet-wheel mounted on the sleeve 22, said sleeve being keyed upon said shaft 4 and forming the hub of the friction clutch-wheel 21. The outer periphery of the clutch-wheel is made tapering and engaged with the corresponding shape of the inner periphery of the rim of the ratchet-wheel 20, as shown in Figs. 2 and 6.

23 represents a nut operating by the hand-wheel 24. 25 represents keepers secured to said nut 23. Their forward ends are flanged to engage with the groove 26, cut in the hub of the pinion-wheel 20.

27 represents a stop for limiting the backward movement of the nut 23. When the nut 23 is turned forward so as to bring the periphery 20 and 21 into engagement, as shown, the ratchet-wheel 20 is locked with the clutch-wheel. Then when said ratchet-wheel is driven forward the shaft 4 is revolved and the knees adjusted by means of the rack and pinion. When the nut 23 is drawn back so as to disengage the connection, then the backward motion of the shaft 4 and the clutch-wheel 21 takes place without the backward movement of the ratchet-wheel 20. This effects an important advantage.

Shafts in machines generally in use move backward, and there is a liability of the pawl catching on the teeth of the ratchet-wheel when it is in full motion and stripping off the teeth or breaking the pawl, whereas by the arrangement herein described no such danger of breakage occurs.

Another feature of our invention relates to the method of constructing the pawl-carriers so as to allow the pawls to move back on the rim of the wheel to operate as differential pawls, one operating to drive the ratchet-wheel forward while the other is making this backward stroke. This we accomplish as follows: The rim of the ratchet-wheel 20 is extended to form the peripheral lugs 28 upon either side, as shown in Figs. 2 and 6.

29 represents a pawl-block, as shown in Figs. 5, 7, 8, and 9. This pawl-block is provided with a segmentary curved slot 30 and a segmentary gib 31, secured to the block by nuts 32. These segmentary gibs 31 are made to fit the lugs 28 on the periphery of the ratchet-wheel, thereby allowing each of said pawl-blocks 29 to travel around the periphery of the wheel, moving on wings.

33 represents the pawls hinged to the pawl-blocks by centers 34. 35 represents a spring for holding said pawl in position. The springs are preferably U-shaped with spiral coil of the form shown in Fig. 7, so as to hold the pawls normally in engagement with the teeth 36 of the ratchet-wheel. In order to move the pawls differentially, we provide a setting-lever 39, suitably journaled upon the shaft 40. To said shaft is keyed a rocking arm 41, which is connected by rods 42 and 43 with the respective pawl-blocks 29. As the pawl-blocks slide freely upon the ways 28 when lever 39 is pushed forward, the pawl of its pawl-block being engaged with the ratchet-teeth 36 locks said pawl-block to the wheel and drives the wheel forward. This forward movement of the connecting-rod 42 by the movement of the setting-lever 39 retracts the opposite connecting-rod 43, which draws its pawl-block hinged thereto backward, its pawl rising over the ratchet-teeth and allowing the backward movement of said pawl-block. A reversed movement of said lever 39 operates said connecting-rods, pawl-blocks, and pawls in the reverse manner. Thus the forward and backward movements of the lever drive the ratchet-wheel forward, equally revolving shaft 4 and moving the knees forward. The backward movement of the knees is obtained by the torsion-spring 44, as shown in Fig. 1. This form of retraction is old and need not be further described.

46 represents a setting-gage of the usual form of construction. The dogging device attached to the knees 8 is constructed as follows: In the upright portion of said knees ways are provided, in which slides a bar 47.

48 represents slots, (we prefer to use three, one vertically above the other,) in which the dogs 49 are made to slide. They are held in the ways by suitable notches. The weight of the bar 47 will normally hold the dogs in a downward position, as shown in Figs. 2 and 3. When it is desired to connect the knees to the log, bar 47 is elevated by means of the lifting-lever 50. This is pivoted to the knee. The forward end of said lever is connected by the link 51, which is hinged to said lever and to the bar 47. When the lever is depressed so as to lift the bar 47 to its highest point, the center 58, which connects the link to the lever 50, is moved past the line drawn from the centers 53 to 54. This locks said bar 47 in its upper position. When the log is to be dogged, the lever 50 is lifted until the link is drawn out of the lock, when the bar descends by gravity and drives either of said dogs 49 into the log or stuff to be dogged. Three of these dogs are shown, one above the other, so that either one may be used, according to the size of the log or timber to be grappled. We have shown two knees. Of course it is obvious that more than two can be connected to the said shaft 4, if desired.

45 represents an improved gage employed to indicate the distance the knees have moved. It consists of a drum 45, provided with a spiral groove 55. On the face of the drum are figures placed at suitable points to indicate the number of inches or fractions which the knees have moved.

56 represents a journal-bracket.

57 represents a socket, in which slides an index-finger 58, which is provided with a tooth 59, that engages in the groove 55. As the journal 56 and socket and index-finger do not revolve, the revolution of the spirally-grooved drum 54 moves the index a distance corresponding to the revolution of the shaft 4, and hence indicate the distance that the knees 8 travel longitudinally.

Having described our invention, what we claim as new is—

1. The combination of the head-blocks, the knees slidable thereon, the rack-bars slidable independent of the knees, the drive-shaft having pinions engaging the rack-bars, setting-levers pivoted to the knees and loosely connected at their lower ends with the rack-bars, means for holding the levers stationary to lock the knees and rack-bars together, a sleeve keyed on the drive-shaft, a ratchet-wheel loosely mounted on the sleeve and having a friction-rim, pawl mechanism for rotating the ratchet-wheel, a friction clutch-wheel connected to the sleeve and having its periphery adapted to engage and disengage the friction-rim of the ratchet-wheel, and means to slide the sleeve for engaging and disengaging the friction-wheel and ratchet-wheel, substantially as described.

2. The combination, with the head-blocks, of the sliding knees, the rack-bars connected with the knees, the driving-shaft having pinions engaging the rack-bars, a sleeve keyed to the drive-shaft, a ratchet-wheel loose on the sleeve having a friction-rim, pawl mechanism for rotating the ratchet-wheel, a friction clutch-wheel fixed to the sleeve and adapted to engage and disengage the friction-rim of the ratchet-wheel, and means to slide the sleeve for engaging and disengaging the friction-wheel and ratchet-wheel, substantially as described.

3. The combination, with the head-blocks, of the sliding knees, the rack-bars connected with the knees, the driving-shaft having pinions engaging the rack-bars, a threaded sleeve keyed to the drive-shaft, a ratchet-wheel loose on the sleeve and having a friction-rim, pawl mechanism for rotating the ratchet-wheel, a friction clutch-wheel fixed on the sleeve to engage and disengage the friction-rim, and a rotating screw-nut loosely connected with the ratchet-wheel and engaging the threaded part of the sleeve to slide the latter, substantially as described.

4. The combination, with the head-blocks, of the sliding knees, the rack-bars connected with the knees, the driving-shaft having pinions engaging the rack-bars, a sliding sleeve keyed to the drive-shaft and provided with a friction clutch-wheel, a ratchet-wheel loosely mounted on the sleeve, pawl mechanism for rotating the ratchet-wheel, and means for sliding the sleeve on the shaft to move the friction clutch-wheel to and from the ratchet-wheel, substantially as described.

5. The combination, with the head-blocks, of the sliding knees, the rack-bars connected with the knees, the driving-shaft having pinions engaging the rack-bars, a sliding sleeve keyed to the drive-shaft and provided with a friction clutch-wheel, a ratchet-wheel loosely mounted on the sleeve, pawl mechanism for rotating the ratchet-wheel, and a rotating screw-nut on the sleeve having keepers loosely engaging the ratchet-wheel to slide the sleeve, substantially as described.

6. The combination, with the knees, the drive-shaft, mechanism for rotating the shaft, and connections for adjusting the knees by the rotation of the shaft, of a drum fixed on the shaft and having a spiral groove, a sliding index-finger having a tooth engaging the spiral groove, and a support for the finger, substantially as described.

In testimony whereof we have hereunto set our hands.

SAMUEL R. SMITH.
EDWARD MYERS.

Witnesses:
EDMUND K. STALLO,
J. WATSON SIMS.